US011475055B2

(12) United States Patent
Chen et al.

(10) Patent No.: US 11,475,055 B2
(45) Date of Patent: Oct. 18, 2022

(54) ARTIFICIAL INTELLIGENCE BASED METHOD AND APPARATUS FOR DETERMINING REGIONAL INFORMATION

(71) Applicant: BEIJING BAIDU NETCOM SCIENCE AND TECHNOLOGY CO., LTD., Beijing (CN)

(72) Inventors: Liangyu Chen, Beijing (CN); Xinyan Xiao, Beijing (CN); Yajuan Lv, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 449 days.

(21) Appl. No.: 15/942,340

(22) Filed: Mar. 30, 2018

(65) Prior Publication Data

US 2018/0341700 A1    Nov. 29, 2018

(30) Foreign Application Priority Data

May 25, 2017    (CN) .......................... 201710379623.8

(51) Int. Cl.
*G06F 16/35* (2019.01)
*G06N 5/00* (2006.01)
(Continued)

(52) U.S. Cl.
CPC ......... *G06F 16/353* (2019.01); *G06N 3/0454* (2013.01); *G06N 5/003* (2013.01); *G06N 5/04* (2013.01); *G06N 20/00* (2019.01)

(58) Field of Classification Search
CPC combination set(s) only.
See application file for complete search history.

(56) References Cited

U.S. PATENT DOCUMENTS 9,367,626 B2 *   6/2016   Pappas ................... G06Q 30/01
2007/0276586 A1 * 11/2007  Jeon ..................... G01C 21/3608
                                                            701/533
(Continued)

FOREIGN PATENT DOCUMENTS

CN    102831234 A    12/2012
CN    103853738 A     6/2014
CN    106021278 A    10/2016

OTHER PUBLICATIONS

Tang Yuanhua "Automatic Discovery and Display of Hotspot Information on Web News," A Dissertation Submitted for the Degree of Master, South China University of Technology, Guangzhou, China, 66 pp.

*Primary Examiner* — Tuankhanh D Phan
(74) *Attorney, Agent, or Firm* — Lathrop GPM LLP

(57) ABSTRACT

The present disclosure discloses an artificial intelligence based method and apparatus for determining regional information. A specific embodiment of the method comprises: acquiring to-be-determined information, and extracting a keyword set of the to-be-determined information; inputting the keyword set of the to-be-determined information into a pre-trained subject classification model for classifying, to obtain a subject category of the to-be-determined information, wherein the subject classification model is used for representing a corresponding relation between the keyword set of the information and the subject category of the information; selecting, from a pre-stored place name set, a place name corresponding to the subject category of the to-be-determined information as a target place name set; matching, in the to-be-determined information, the target place name set; and determining, based on a matching result, whether the to-be-determined information belongs to the regional information.

21 Claims, 5 Drawing Sheets

(51) Int. Cl.
  *G06N 3/04*   (2006.01)
  *G06N 5/04*   (2006.01)
  *G06N 20/00*   (2019.01)

(56) References Cited

U.S. PATENT DOCUMENTS

| | | | |
|---|---|---|---|
| 2010/0205541 A1* | 8/2010 | Rapaport | G06Q 30/02 |
| | | | 715/753 |
| 2014/0325366 A1* | 10/2014 | Dunphey | G06Q 10/10 |
| | | | 715/738 |
| 2015/0186532 A1 | 7/2015 | Agarwal et al. | |
| 2016/0034305 A1* | 2/2016 | Shear | G06F 16/248 |
| | | | 707/722 |
| 2017/0083817 A1* | 3/2017 | Di Sciullo | G06N 5/022 |
| 2018/0129725 A1* | 5/2018 | Barkie | H04W 4/21 |

* cited by examiner

ARTIFICIAL INTELLIGENCE BASED METHOD AND APPARATUS FOR DETERMINING REGIONAL INFORMATION

CROSS-REFERENCE TO RELATED APPLICATION

This application is related to and claims priority from Chinese Application No. 201710379623.8, filed on May 25, 2017 and entitled "Artificial Intelligence Based Method and Apparatus for Determining Regional Information", the entire disclosure of which is hereby incorporated by reference.

TECHNICAL FIELD

The present disclosure relates to the field of computer technologies, and particularly to the field of Internet technologies, and more particularly to an artificial intelligence based method and apparatus for determining regional information.

BACKGROUND

The rapid development of artificial intelligence (AI) technology has facilitated one's daily work and life. Artificial intelligence is a new technological science which studies and develops theories, methods, techniques and applications for simulating, extending, and expanding human intelligence. Artificial intelligence as a branch of computer science, seeks to understand the essence of intelligence and to produce a new type of intelligent machine which responds in a manner similar to the human intelligence. Research in this area includes, such as, robotics, speech recognition, image recognition, natural language processing and expert systems. Artificial intelligence is more and more integrated into applications, the applications combined with artificial intelligence may accurately determine the type of information, and push different types of information to an appropriate user according to the needs of different users.

News generally refers to spreading information through media such as newspapers, radios, broadcasts, television stations and Internet, it is a literary form which records the society, spreads information and reflects the era. According to different classification approaches, news may be divided into different classes, for example, news can be divided into regional news and non-regional news. The regional news is usually only suitable for being pushed to users in a specific area because of its strong regional characteristics. The non-regional news is usually suitable for being pushed to all users because the user who is interested in it is not limited to the user in some specific areas.

The existing method for determining regional news determines regional news merely by determining whether there is a place name in the news. If there is, it is determined to be regional news; if not, it is determined to be non-regional news. The existing regional news is determined in a rudimentary way with low accuracy.

SUMMARY

The embodiments of present disclosure are to provide an improved artificial intelligence based method and apparatus for determining regional information, to solve the technical problems mentioned in the above background section.

According to a first aspect, the embodiment of the present disclosure provides an artificial intelligence based method for determining regional information. The method comprises: acquiring to-be-determined information, and extracting a keyword set of the to-be-determined information; inputting the keyword set of the to-be-determined information into a pre-trained subject classification model for classifying, to obtain a subject category of the to-be-determined information, wherein the subject classification model being used for representing a corresponding relation between the keyword set of the information and the subject category of the information; selecting, from a pre-stored place name set, a place name corresponding to the subject category of the to-be-determined information as a target place name set; matching, in the to-be-determined information, the target place name set; and determining, based on a matching result, whether the to-be-determined information belongs to the regional information.

In some embodiments, the place name set is stored in a place name data table, and rows or columns of the place name data table are used for storing place names belonging to respective administrative levels; and the selecting, from a pre-stored place name set, a place name corresponding to the subject category of the to-be-determined information as a target place name set, comprises: acquiring, based on a pre-set corresponding relation between the subject classes and the administrative levels, the administrative level corresponding to the subject category of the to-be-determined information; and selecting, from the place name data table, the place name belonging to the administrative level corresponding to the subject category of the to-be-determined information as the target place name set.

In some embodiments, the matching, in the to-be-determined information, the target place name set, comprises: intercepting an information fragment at a pre-set position of the to-be-determined information; performing word segmentation on the information segment, to acquire a keyword set of the information segment; and matching the target place name set with the keyword set of the information segment, to acquire a number of successfully matched keywords.

In some embodiments, the determining, based on a matching result, whether the to-be-determined information belongs to the regional information, comprises: determining the to-be-determined information belonging to the regional information, if the number of the successfully matched keywords is greater than a first pre-set threshold; and determining the to-be-determined information not belonging to the regional information, if the number of the successfully matched keywords is not greater than the first pre-set threshold.

In some embodiments, the method further comprises: matching a pre-set hot word set in the to-be-determined information, in response to the number of the successfully matched keywords being greater than a first pre-set threshold.

In some embodiments, the determining, based on a matching result, whether the to-be-determined information belongs to the regional information, comprises: determining the to-be-determined information belonging to the regional information, if the to-be-determined information does not include a hot word in the hot word set; and determining the to-be-determined information not belonging to the regional information, if the to-be-determined information includes the hot word in the hot word set.

In some embodiments, the method further comprises: inputting the keyword set of the to-be-determined information into a pre-trained information classification model for classifying, to obtain a category of the to-be-determined information, in response to determining the to-be-determined information not including the hot word in the hot word set, wherein the information classification model is used for representing a corresponding relation between the keyword set of the information and the category of the information, the category of the information comprises a category of hot information and a category of non-hot information.

In some embodiments, the determining, based on a matching result, whether the to-be-determined information belongs to the regional information, comprises: determining the to-be-determined information belonging to the regional information, if the category of the to-be-determined information is the category of the non-hot information; and determining the to-be-determined information not belonging to the regional information, if the category of the to-be-determined information is the category of the hot information.

In some embodiments, the method further comprises a step of building the information classification model, wherein the step of building the information classification model comprises: acquiring sample information, and extracting a keyword set of the sample information; counting a number of historical clicks on the sample information within a pre-set period; assigning the sample information having the number of historical clicks greater than a second pre-set threshold as positive sample information, and assigning the sample information having the number of historical clicks not greater than the second pre-set threshold as negative sample information, wherein the category of the positive sample information is the category of the hot information, the category of the negative sample information is the category of the non-hot information; and training, using a machine learning method, with the keyword set of the positive sample information and the keyword set of the negative sample information as respective inputs, and the category of the hot information and the category of the non-hot information as respective outputs, to obtain the information classification model.

In some embodiments, the method further comprises: acquiring geographical location information of a target user, in response to determining the to-be-determined information belonging to the regional information, and determining whether the geographical location information matches with the regional information corresponding to the to-be-determined information, and if yes, pushing the to-be-determined information to the target user; and pushing the to-be-determined information to the target user, in response to determining the to-be-determined information not belonging to the regional information.

According to a second aspect, the embodiment of the present disclosure provides an artificial intelligence based apparatus for determining the regional information. The apparatus comprises: an extracting unit, configured to acquire to-be-determined information, and extract a keyword set of the to-be-determined information; a first classifying unit, configured to input the keyword set of the to-be-determined information into a pre-trained subject classification model for classifying, to obtain a subject category of the to-be-determined information, wherein the subject classification model is used for representing a corresponding relation between the keyword set of the information and the subject category of the information; a selecting unit, configured to select, from a pre-stored place name set, a place name corresponding to the subject category of the to-be-determined information as a target place name set; a first matching unit, configured to match, in the to-be-determined information, the target place name set; and a determining unit, configured to determine, based on a matching result, whether the to-be-determined information belongs to the regional information.

In some embodiments, the place name set is stored in a place name data table, and rows or columns of the place name data table are used for storing place names belonging to respective administrative levels; and the selecting unit comprises: an acquiring sub-unit, configured to acquire, based on a pre-set corresponding relation between subject classes and the administrative levels, the administrative level corresponding to the subject category of the to-be-determined information; and a selecting sub-unit, configured to select, from the place name data table, the place name belonging to the administrative level corresponding to the subject category of the to-be-determined information as the target place name set.

In some embodiments, the first matching unit comprises: an intercepting sub-unit, configured to intercept an information fragment at a pre-set position of the to-be-determined information; a word segmenting sub-unit, configured to perform word segmentation on the information segment, to acquire the keyword set of the information segment; and a matching sub-unit, configured to match the target place name set with the keyword set of the information segment, to acquire a number of successfully matched keywords.

In some embodiments, the determining unit is further configured to: determine the to-be-determined information belonging to the regional information, if the number of the successfully matched keywords is greater than a first pre-set threshold; and determine the to-be-determined information not belonging to the regional information, if the number of the successfully matched keywords is not greater than the first pre-set threshold.

In some embodiments, the apparatus further comprises: a second matching unit, configured to match a pre-set hot word set in the to-be-determined information, in response to the number of the successfully matched keywords being greater than a first pre-set threshold.

In some embodiments, the determining unit is further configured to: determine the to-be-determined information belonging to the regional information, if the to-be-determined information does not include a hot word in the hot word set; and determine the to-be-determined information not belonging to the regional information, if the to-be-determined information includes the hot word in the hot word set.

In some embodiments, the apparatus further comprises: a second classifying unit, configured to: input the keyword set of the to-be-determined information into a pre-trained information classification model for classifying, to obtain a category of the to-be-determined information, in response to determining the to-be-determined information not including the hot word in the hot word set, wherein the information classification model is used for representing a corresponding relation between the keyword set of the information and the category of the information, and the category of the information comprises a category of hot information and a category of non-hot information.

In some embodiments, the determining unit is further configured to: determine the to-be-determined information belonging to the regional information, if the category of the to-be-determined information is the category of the non-hot information; and determine the to-be-determined information not belonging to the regional information, if the category of the to-be-determined information is the category of the hot information.

In some embodiments, the apparatus further comprises an information classification model building unit, wherein the information classification model building unit comprises: an extracting sub-unit, configured to acquire sample information, and extract a keyword set of the sample information; a counting sub-unit, configured to count a number of historical clicks on the sample information within a pre-set period; a determining sub-unit, configured to assign the sample information having the number of historical clicks greater than a second pre-set threshold as positive sample information, and assign the sample information having the number of historical clicks not greater than the second pre-set threshold as negative sample information, wherein a category of the positive sample information is the category of the hot information, a category of the negative sample information is the category of the non-hot information; and a training sub-unit, configured to train, using a machine learning method, with a keyword set of the positive sample information and a keyword set of the negative sample information as respective inputs, and the category of the hot information and the category of the non-hot information as respective outputs, to obtain the information classification model.

In some embodiments, the apparatus further comprises: a first pushing unit, configured to: in response to determining the to-be-determined information belonging to the regional information, acquiring geographical location information of the target user, determining whether the geographical location information matches with the regional information corresponding to the to-be-determined information, and if yes, push the to-be-determined information to a target user; and a second pushing unit, configured to push the to-be-determined information to the target user, in response to determining the to-be-determined information not belonging to the regional information.

According to a third aspect, the embodiment of the present disclosures provides a server. The server comprises: one or more processors; and a storing apparatus, for storing one or more programs; wherein the one or more programs, when executed by the one or more processors, cause the processors to implement the method according to any implementation described in the first aspect.

According to a fourth aspect, the embodiment of the present disclosures provides a computer-readable storage medium, storing a computer program thereon, wherein the program, when executed by a processor, causes the processor to implement the method according to any one of the implementations in the first aspect.

The artificial intelligence based method and apparatus for determining regional information provided in the embodiments of the present disclosure, through extracting a keyword set of the acquired to-be-determined information, to input the keyword set of the to-be-determined information into a pre-trained subject classification model for classifying, thereby obtains a subject category of the to-be-determined information; afterwards, selects a target place name set from a pre-stored place name set, based on the subject category of the to-be-determined information; finally, matches the target place name set in the to-be-determined information, and based on the matching result, determines whether the to-be-determined information belongs to the regional information. The analysis is performed on the to-be-determined information, through artificial intelligence, to automatically determine whether the to-be-determined information belongs to the regional information, improving the accuracy of determining the regional information, thereby contributing to implementation of the targeted information pushing.

BRIEF DESCRIPTION OF THE DRAWINGS

Other characteristics, objectives and advantages of the present disclosure will become more apparent from the reading of the detailed description of the non-limiting embodiments in which reference is made to the appended drawings wherein.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
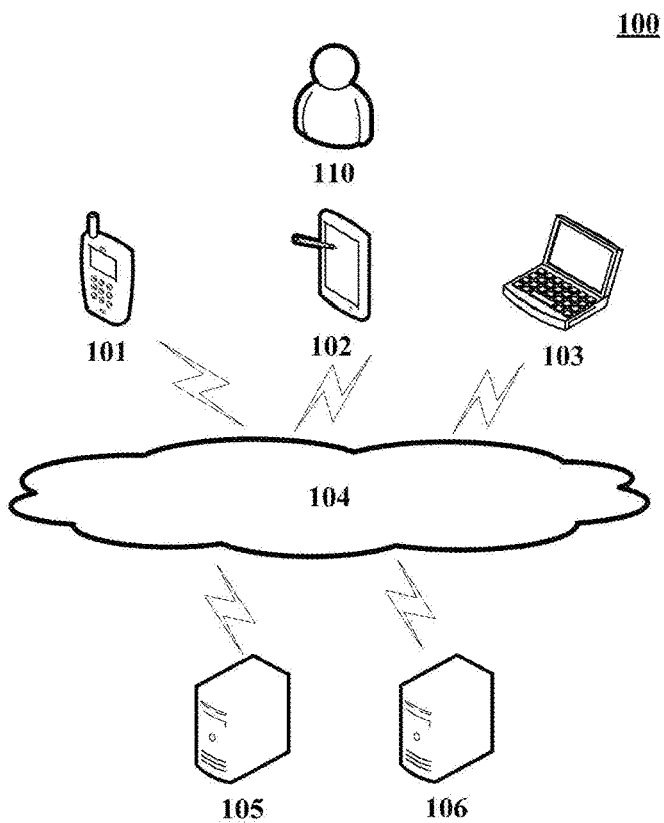
FIG. 1 is an exemplary system architecture diagram to which the present disclosure may be applied.

FIG. 1 shows an exemplary architecture of a system 100 which may be used by an artificial intelligence based method or apparatus for determining regional information according to the embodiments of the present disclosure.

As shown in FIG. 1, the system architecture 100 may include terminal devices 101, 102 and 103, a network 104, a server 105 and a database server 106. The network 104 serves as a medium providing a communication link between the terminal devices 101, 102 and 103, the server 105 and the database server 106. The network 104 may include various types of connections, such as wired or wireless transmission links, or optical fibers.

The user 110 may use the terminal devices 101, 102 and 103 to interact with the server 105 through the network 104, in order to transmit or receive messages, etc. For example, the user 110 may use the terminal devices 101, 102 and 103 to send to-be-determined information to the server 105 via the network 104. Here, the terminal devices 101, 102 and 103 may be various electronic devices, including but not limited to, smart phones, tablet computers, e-book readers, laptop computers and desktop computers.

The database server 106 may also be used for storing the to-be-determined information, so that the server 105 acquires the to-be-determined information from the database server 106 through the network 104.

The server 105 may be a server providing various services. For example, the server 105 may acquire the to-be-determined information from the terminal devices 101, 102, or 103 or from the database server 106, and perform process, such as analysis, on the acquired to-be-determined information, and output a processing result (for example, the to-be-determined information belongs to the regional information or the to-be-determined information does not belong to the regional information).

It should be noted that, the artificial intelligence based method for determining regional information provided by the embodiment of the present disclosure is generally executed by the server 105, accordingly, an artificial intelligence based apparatus for determining regional information is generally provided in the server 105.

It should be understood that, the numbers of terminal devices, the networks, servers, and database servers in FIG. 1 are merely illustrative. Depending on needs of implementation, there may be any number of the terminals, the networks, the servers, and the database servers. In the case the server 105 stores the to-be-determined information, the system architecture 100 may not be provided with the terminal devices 101, 102, and 103 or the database server 106.

Figure 2:
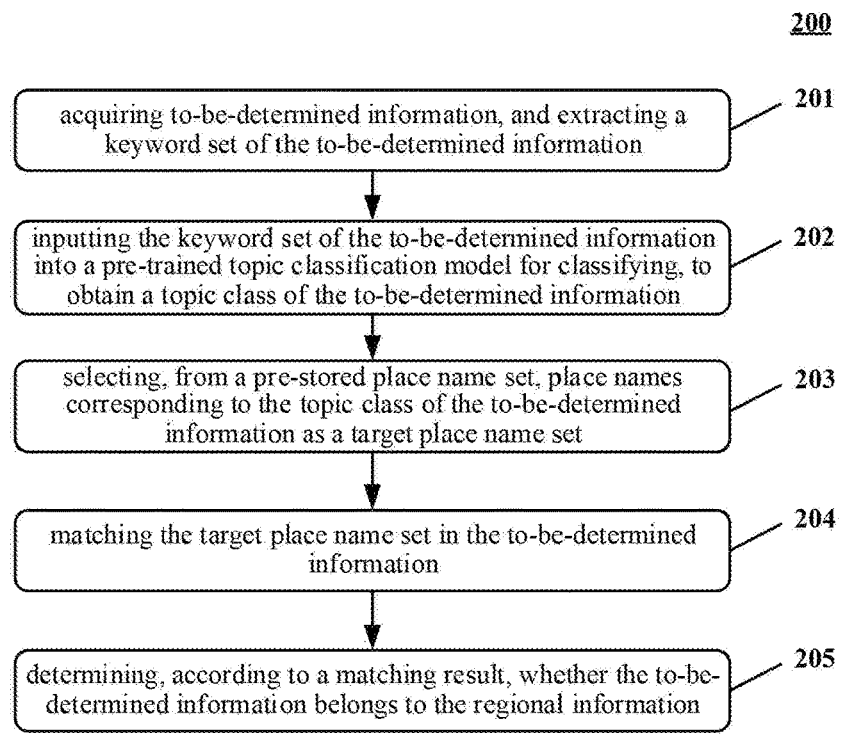
FIG. 2 is a flow chart of the artificial intelligence based method for determining regional information according to one embodiment of the present disclosure.

Further referring to FIG. 2, which shows a flow 200 of the artificial intelligence based method for determining regional information according to one embodiment of the present disclosure. The artificial intelligence based method for determining regional information comprises following steps:

At step 201, acquiring to-be-determined information, and extracting a keyword set of the to-be-determined information.

In the present embodiment, an electronic device (for example, the server 105 shown in FIG. 1), on which the artificial intelligence based method for determining regional information runs, may: firstly acquire the to-be-determined information; then perform content analysis on the to-be-determined information, so as to extract at least one of the keywords of the to-be-determined information to generate a keyword set of the to-be-determined information. Wherein the to-be-determined information may be text information on the internet. As an example, the to-be-determined information may be news on the internet.

In some optional implementations of the present embodiment, the electronic device may perform word segmentation on the to-be-determined information, acquire at least one of the keywords of the to-be-determined information to generate a keyword set of the to-be-determined information. For example, the electronic device may: perform process on the content of the to-be-determined information by using a method of omni-word segmentation, to segment the content into words; then perform importance calculation on the obtained words (for example, adopting the TF-IDF (Term Frequency-Inverse Document Frequency)); finally, keywords are selected based on the result of the importance calculation, to generate a keyword set.

It should be noted that, the electronic device may acquire the to-be-determined information from a local client (for example, the terminal devices 101, 102, 103 shown in FIG. 1) in communication connection with the electronic device, or a database server (for example, the database server 106 shown in FIG. 1) in communication connection with the electronic device. The present embodiment imposes no limitation on where the electronic device acquires the to-be-determined information from.

At step 202, inputting the keyword set of the to-be-determined information into a pre-trained subject classification model for classifying, to obtain a subject category of the to-be-determined information.

In the present embodiment, based on the keyword set of the to-be-determined information extracted in step 201, the electronic device may input the keyword set of the to-be-determined information into a pre-trained subject classification model for classifying, so as to obtain a subject category of the to-be-determined information. Wherein the subject of information i.e. the main theme of the information, usually refers to the field of social life depicted by the information, that is, certain aspect of real life. For example, the subject category of the information may include, but not limited to: such as, a subject category of technology, a subject category of finance, a subject category of politics, a subject category of tourism.

In the present embodiment, the subject classification model may be used for representing a corresponding relation between the keyword set of the information and the subject category of the information. Here, the electronic device may build the subject classification model in various approaches.

In some optional implementations of the present embodiment, the electronic device may generate, based on the statistics on a plenty of keyword sets of the information and subject classes of the information, a corresponding relation table storing multiple corresponding relations between the keyword sets of the information and the subject classes of the information, and assign this corresponding relation table as the subject classification model.

In some optional implementations of the present embodiment, the above electronic device may build the subject classification model according to following steps.

Firstly, the electronic device may acquire sample information and a subject category of the sample information. Wherein the subject category of the sample information may be pre-set based on experience by the person skilled in the art.

Then, the electronic device may extract a keyword set of the sample information. Wherein the electronic device may perform word segmentation on the sample information, acquire at least one of the keywords of the sample information to generate the keyword set of the sample information.

Finally, by using the method of machine learning, the electronic device may train the DCNN (Deep Convolutional Neural Network) with the keyword set of the sample information as inputs and the subject category of the sample information as outputs, to obtain the subject classification model capable of building an accurate corresponding relation between the keyword set of the sample information and the subject category of the sample information.

At step 203, selecting, from a pre-stored place name set, place names corresponding to the subject category of the to-be-determined information as a target place name set.

In the present embodiment, based on the subject category of the to-be-determined information obtained in step 202, the electronic device may select, from the pre-stored place name set, place names corresponding to the subject category of the to-be-determined information as the target place name set.

In some optional implementations of the present embodiment, the place name set may be stored in multiple text files, where each of the text files may correspond to one of the subject classes. After obtaining the subject category of the to-be-determined information, the electronic device may select, from the text files, a text file corresponding to the subject category of the to-be-determined information, and assign place names stored in this text file as the target place name set.

In some optional implementations of the present embodiment, the place name set may be stored in a place name data table, and rows or columns of the place name data table are respectively used for storing the place names belonging to respective administrative levels. For example, the rows or the columns of the place name data table are respectively used for storing, such as, place names at national level, place names at provincial level, place names at prefectural level, place names at country level, and place names at township level. At the same time, the electronic device may pre-store the corresponding relations between the subject classes and administrative levels. Generally, the subject classes and the corresponding administrative levels can be pre-stored in a corresponding relation table. Wherein the administrative level corresponding to the subject category may be pre-set based on experience by the person skilled in the art. For example, the subject category of technology corresponds to the country level and the township level, the subject category of finance corresponds to the prefectural level, the country level and the township level. After obtaining the subject category of the to-be-determined information, the electronic device may firstly acquire the administrative level corresponding to the subject category of the information, based on the corresponding relation between the subject classes and the administrative levels; and then select, from the place name data table, the place names belonging to the administrative level corresponding to the subject category of the to-be-determined information as the target place name set. As an example, in the case the subject category of the to-be-determined information is the subject category of technology, the electronic device may firstly inquire the corresponding relation table, and obtain therefrom the administrative level corresponding to the subject category of technology, that is, the county level and the township level; then, inquire the place name data table, and select place names as the target place name set, from the row or the column corresponding to the county level and township level.

At step 204, matching the target place name set in the to-be-determined information.

In the present embodiment, based on the target place name set selected in step 203, the electronic device may match the target place name set in the to-be-determined information. As an example, the electronic device may compare each of the target place names in the target place name set, in the to-be-determined information, and record the target names appearing in the to-be-determined information and the number of appearances. As an example, the electronic device may compare each of the target place names in the target place name set with each of the keywords in the keyword set of the to-be-determined information in turn, and if there is a target place name same with a keyword, record the target place name, and plus one on the number of appearances of the target place name (the initial number of appearances should be zero), and continue to compare until all the comparisons are completed.

At step 205, determining, according to a matching result, whether the to-be-determined information belongs to the regional information.

In the present embodiment, based on the matching result in the step 204, the electronic device may determine whether the to-be-determined information belongs to the regional information. Here, the regional information generally has strong regional characteristics, and usually only the users in a specific area are interested in it. The non-regional information generally has no regional characteristic, and the users interested in it are not limited to the users in some specific areas. For example, for the news reporting " country convenes country government work conference", normally only the users in the " country" will be interested in it, thus this news is regional news; for the news reporting "New Provisions for the Administration of Internet News Information Services", the users interested in it are not limited to the users in some specific area, thus this news is non-regional news.

In the present embodiment, the electronic device may determine whether the to-be-determined information belongs to the regional information, based on the target place name appearing in the to-be-determined information and the number of appearances. As an example, the target place name "** county" appears in the to-be-determined information more than 5 times, then the electronic device may determine the to-be-determined information belonging to the regional information.

In some optional implementations of the present embodiment, if the to-be-determined information belongs the regional information, then the to-be-determined information is usually only suitable for being pushed to users in a specific area. The electronic device may first acquire geographical location information of the target user; and then determine whether the geographical location information matches with the regional information corresponding to the to-be-determined information. If the geographical location information matches the regional information corresponding to the to-be-determined information, it indicates that the target user is a user interested in the to-be-determined information, then the electronic device may push the to-be-determined information to the target user. If the geographical location information does not match the regional information corresponding to the to-be-determined information, it indicates that the target user is not a user interested in the to-be-determined information, then the electronic device will no longer push the to-be-determined information to the target user. Wherein the target user is a user to whom the electronic device may push the information. For example, the to-be-determined information is news on website "XX", then the target user may be a user who registers the website "XX". The geographical location of the target user may be a current geographical location of the target user, or may be a geographical location filled by the target user when registering the website "XX". The region corresponding to the to-be-determined information may be determined through the target place name existing in the to-be-determined information.

In some optional implementations of the present embodiment, if the to-be-determined information does not belong to the regional information, then the to-be-determined information is suitable to be pushed to all users. Here, the electronic device may directly push the to-be-determined information to the target user.

The artificial intelligence based method for determining regional information provided in the embodiments of the present disclosure, through extracting the keyword set of the acquired to-be-determined information, to input the keyword set of the to-be-determined information into a pre-trained subject classification model for classifying, so as to obtain a subject category of the to-be-determined information; afterwards, selecting a target place name set from a pre-stored place name set, based on the subject category of the to-be-determined information; finally, matching the target place name set in the to-be-determined information, and based on the matching result, determining whether the to-be-determined information belongs to the regional information. The analysis is performed on the to-be-determined information, through artificial intelligence, to automatically determine whether the to-be-determined information belongs to the regional information, improving the accuracy of determining the regional information, thereby contributing to implementation of the targeted information pushing.

Figure 3:
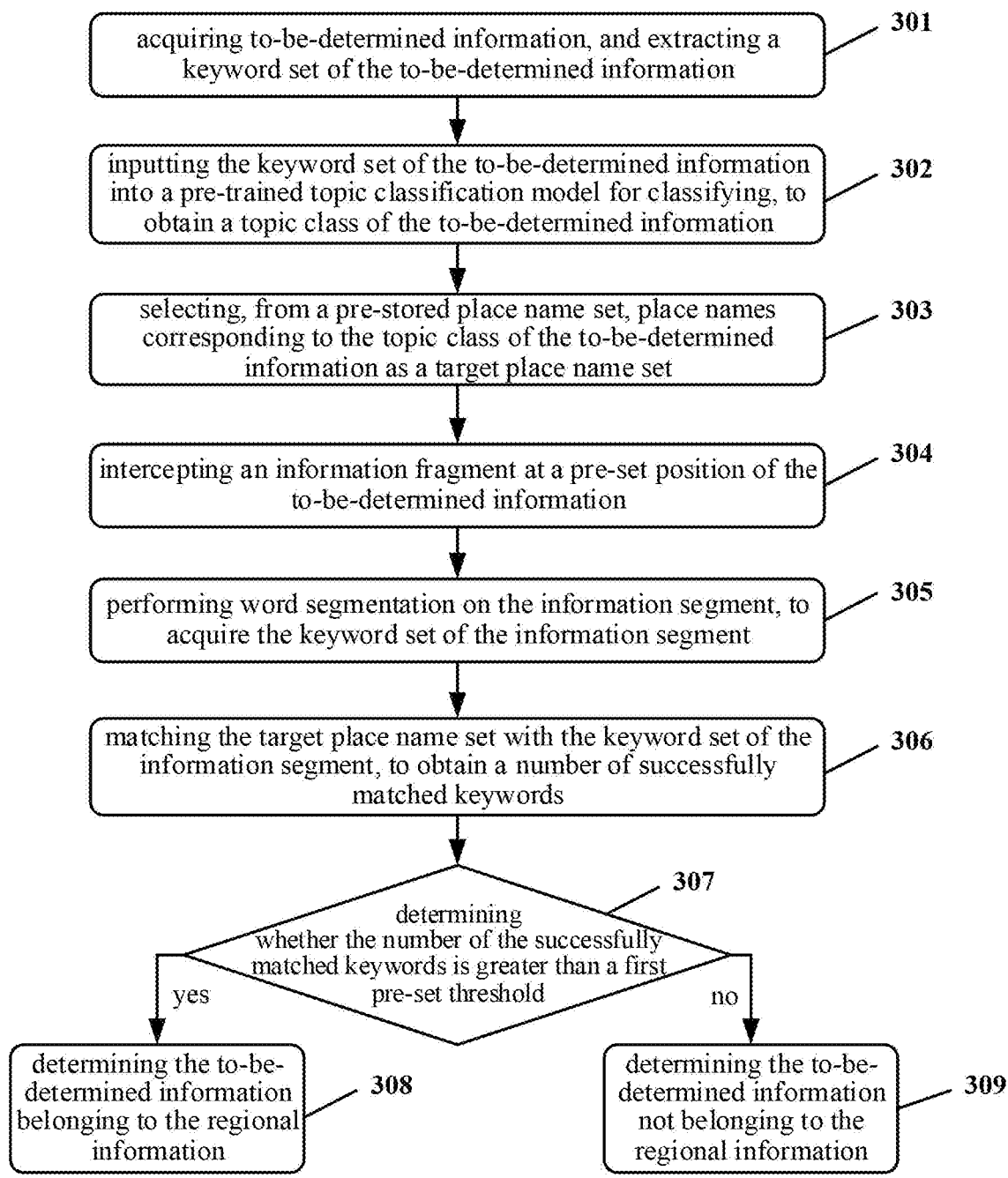
FIG. 3 is a flow chart of the artificial intelligence based method for determining regional information according to one more embodiment of the present disclosure.

Further referring to FIG. 3, which shows a flow 300 of the artificial intelligence based method for determining regional information according to one more embodiment. The flow 300 of the artificial intelligence based method for determining regional information comprises following steps.

At step 301, acquiring to-be-determined information, and extracting a keyword set of the to-be-determined information.

In the present embodiment, an electronic device (for example, the server 105 shown in FIG. 1), on which the artificial intelligence based method for determining regional information runs, may firstly acquire to-be-determined information; then perform content analysis on the to-be-determined information, so as to extract at least one of the keywords of the to-be-determined information to generate a keyword set of the to-be-determined information. Wherein the to-be-determined information may be text information on the internet. As an example, the to-be-determined information may be news on the internet.

At step 302, inputting the keyword set of the to-be-determined information into a pre-trained subject classification model for classifying, to obtain a subject category of the to-be-determined information.

In the present embodiment, based on the keyword set of the to-be-determined information extracted in step 301, the electronic device may input the keyword set of the to-be-determined information into a pre-trained subject classification model for classifying, so as to obtain a subject category of the to-be-determined information. Wherein the subject of information i.e. the main theme of the information, usually refers to the field of social life depicted by the information, that is, certain aspect of real life. For example, the subject category of the information may include, but not limited to: such as, a subject category of technology, a subject category of finance, a subject category of politics, a subject category of tourism.

At step 303, selecting, from a pre-stored place name set, place names corresponding to the subject category of the to-be-determined information as a target place name set.

In the present embodiment, based on the subject category of the to-be-determined information obtained in step 302, the electronic device may select, from the pre-stored place name set, place names corresponding to the subject category of the to-be-determined information as the target place name set.

At step 304, intercepting an information fragment at a pre-set position of the to-be-determined information.

In the present embodiment, the electronic device may intercept an information fragment at a pre-set position of the to-be-determined information. Wherein the information fragment at the pre-set position may be a few paragraphs at the head of the to-be-determined information, or maybe a few paragraphs in the middle of the to-be-determined information, or also maybe a few paragraphs at the tail of the to-be-determined information. As an example, if the to-be-determined information is news on the internet, then the information segment may be preamble of the news, or the first 100 words of the news.

At step 305, performing word segmentation on the information segment, to acquire the keyword set of the information segment.

In the present embodiment, based on the information fragment intercepted in step 304, the electronic device may perform word segmentation on the information segment, acquire at least one of the keywords in the information fragment to generate a keyword set of the information fragment. Here, normally the electronic device does not perform de-duplication on the keywords when performing the word segmentation on the information segment.

At step 306, matching the target place name set with the keyword set of the information segment, to obtain a number of successfully matched keywords.

In the present embodiment, based on the target place name set selected in step 303 and the keyword set of the information segment acquired in step 305, the electronic device may match the target place name set with the keyword set of the information segment, to obtain the number of the successfully matched keywords. As an example, the electronic device may compare each of the target place names in the target place name set with each of the keywords in the keyword set of the information fragment in turn, and if there is a target place name same with a keyword, the matching is successful, then record the target place name, and plus one on the number of the keywords (the initial number should be zero), and continue to compare until all the comparisons are completed, that is, the successfully matched keywords and the number of the successfully matched keywords can be acquired.

At step 307, determining whether the number of the successfully matched keywords is greater than a first pre-set threshold.

In the present embodiment, based on the number of the successfully matched keywords that is acquired in step 306, the electronic device may compare the number of the successfully matched keywords with the first pre-set threshold (for example the first pre-set threshold is three); execute step 308 if the number of the successfully matched keywords is greater than the first pre-set threshold; execute step 309 if the number of the successfully matched keywords is not greater than the first pre-set threshold.

At step 308, determining the to-be-determined information belonging to the regional information.

At step 309, determining the to-be-determined information not belonging to the regional information.

It can be seen from FIG. 3 that, compared with the embodiments corresponding to FIG. 2, the flow 300 of the artificial intelligence based method for determining regional information in the present embodiment highlights the step of matching the target place name set in the to-be-determined information. Therefore, the solution described in the present embodiment may intercept an information segment at the pre-set position of the to-be-determined information, and determine whether the to-be-determined information belongs to the regional information through the matching result between the target place name set and the keyword set of the information segment. Wherein the number of the keywords in the keyword set of the intercepted information segment is significantly less than the number of the keywords in the keyword set of the to-be-determined information, thereby the workload of the matching is greatly reduced.

Figure 4:
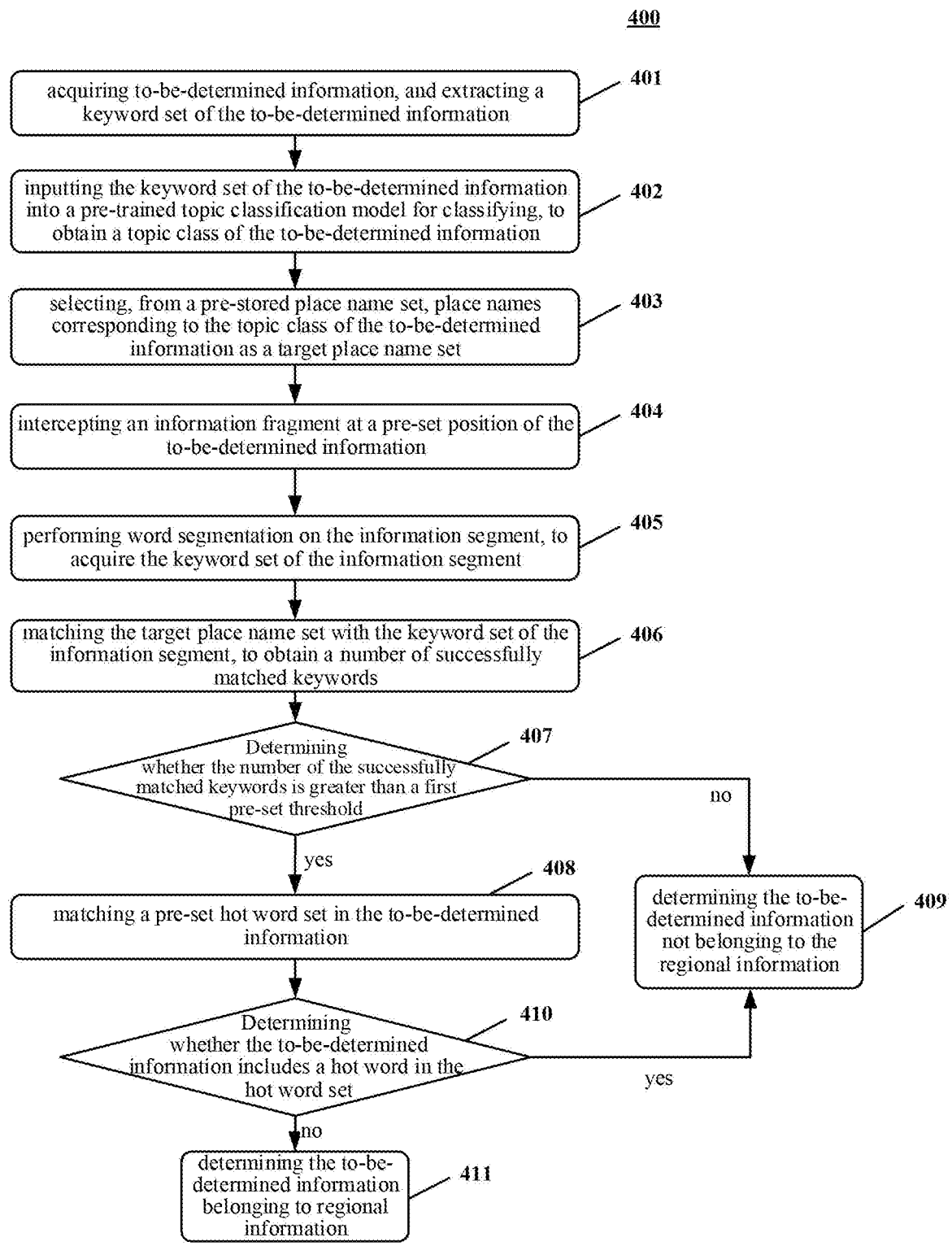
FIG. 4 is a flow chart of the artificial intelligence based method for determining regional information according to another embodiment of the present disclosure.

Further referring to FIG. 4, which shows a flow 400 of the artificial intelligence based method for determining regional information according to another embodiment of the present disclosure. The flow 400 of the artificial intelligence based method for determining regional information comprises:

At step 401, acquiring to-be-determined information, and extracting a keyword set of the to-be-determined information.

In the present embodiment, an electronic device (for example, the server 105 shown in FIG. 1), on which the artificial intelligence based method for determining regional information runs, may: firstly acquire the to-be-determined information; then perform content analysis on the to-be-determined information, so as to extract at least one of the keywords of the to-be-determined information to generate a keyword set of the to-be-determined information. Wherein the to-be-determined information may be text information on the internet. As an example, the to-be-determined information may be news on the internet.

At step 402, inputting the keyword set of the to-be-determined information into a pre-trained subject classification model for classifying, to obtain a subject category of the to-be-determined information.

In the present embodiment, based on the keyword set of the to-be-determined information extracted in step 401, the electronic device may input the keyword set of the to-be-determined information into a pre-trained subject classification model for classifying, so as to obtain a subject category of the to-be-determined information. Wherein the subject of information i.e. the main theme of the information, usually refers to the field of social life depicted by the information, that is, certain aspect of real life. For example, the subject category of the information may include, but not limited to: such as, a subject category of technology, a subject category of finance, a subject category of politics, a subject category of tourism.

At step 403, selecting, from a pre-stored place name set, place names corresponding to the subject category of the to-be-determined information as a target place name set.

In the present embodiment, based on the subject category of the to-be-determined information obtained in step 402, the electronic device may select, from the pre-stored place name set, place names corresponding to the subject category of the to-be-determined information as the target place name set.

At step 404, intercepting an information fragment at a pre-set position of the to-be-determined information.

In the present embodiment, the electronic device may intercept an information fragment at a pre-set position of the to-be-determined information. Wherein the information fragment at the pre-set position may be a few paragraphs at the head of the to-be-determined information, or maybe a few paragraphs in the middle of the to-be-determined information, or also maybe a few paragraphs at the tail of the to-be-determined information.

At step 405, performing word segmentation on the information segment, to acquire the keyword set of the information segment.

In the present embodiment, based on the information fragment intercepted in step 404, the electronic device may perform word segmentation on the information segment, acquire at least one of the keywords in the information fragment to generate a keyword set of the information fragment. Here, normally the electronic device does not perform de-duplication on the keywords when performing word segmentation on the information segment.

At step 406, matching the target place name set with the keyword set of the information segment, to obtain a number of the successfully matched keywords.

In the present embodiment, based on the target place name set selected in step 403 and the keyword set of the information segment acquired in step 405, the electronic device may match the target place name set with the keyword set of the information segment, to acquire the number of the successfully matched keywords. As an example, the electronic device may compare each of the target place names in the target place name set with each of the keywords in the keyword set of the information fragment in turn, and if there is a target place name same with a keyword, the matching is successful, then record the target place name, and plus one on the number of the keywords (the initial number should be zero), and continue to compare until all the comparisons are completed, that is, the successfully matched keywords and the number of the successfully matched keywords can be acquired.

At step 407, determining whether the number of the successfully matched keywords is greater than a first pre-set threshold.

In the present embodiment, based on the number of the successfully matched keywords that is acquired in step 406, the electronic device may compare the number of the successfully matched keywords with the first pre-set threshold (for example the first pre-set threshold is three); execute step 408 if the number of the successfully matched keywords is greater than the first pre-set threshold; execute step 409 if the number of the successfully matched keywords is not greater than the first pre-set threshold.

At step 408, matching a pre-set hot word set in the to-be-determined information.

In the present embodiment, in the case the number of the successfully matched keywords is greater than the first pre-set threshold, the electronic device may match a hot word set in the to-be-determined information. Wherein the hot word set may be pre-set based on experience by the person skilled in the art. For example, the hot word set may include, but not limited to: the hot words such as: "murders", "multiple pile-up", "pricey prawn". As an example, the electronic device may compare each of the hot words in the hot word set with each of the keywords in the keyword set of the to-be-determined information in turn; if there is a hot word same with a keyword, it indicates that the to-be-determined information includes a hot word in the hot word set; otherwise, it indicates that the to-be-determined information does not include a hot word in the hot word set.

At step 409, determining the to-be-determined information not belonging to the regional information.

At step 410, determining whether the to-be-determined information includes a hot word in the hot word set.

In the present embodiment, based on the matching result of the step 408, the electronic device may determine whether the to-be-determined information includes a hot word in the hot word set; if the to-be-determined information includes a hot word in the hot word set, it indicates that the to-be-determined information is the most influential event in a specific area, at this point, the to-be-determined information is no longer suitable to be determined as regional information, and return to execute the step 409; if the to-be-determined information does not include a hot word in the hot word set, execute the step 411.

At step 411, determining the to-be-determined information belonging to regional information.

It can be seen from FIG. 4 that, compared with the embodiments corresponding to FIG. 2, the flow 400 of the artificial intelligence based method for determining regional information in the present embodiment adds the step of matching the hot word set in the to-be-determined information. Therefore, the solution described in the present embodiment reduces the cases that the to-be-determined information is determined as the regional information by mistake, and improves the recall rate of the to-be-determined information.

Figure 5:
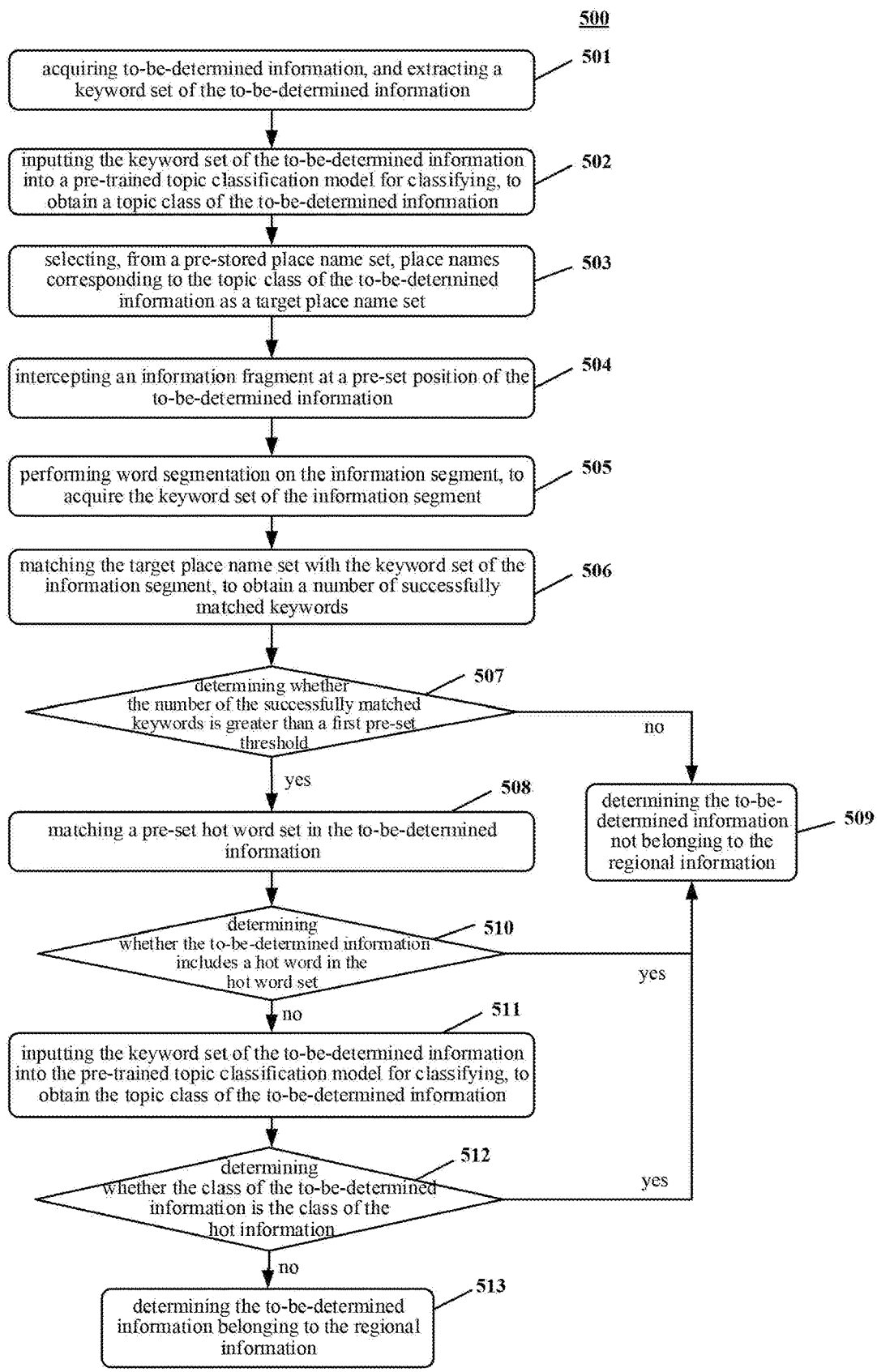
FIG. 5 is a flow chart of the artificial intelligence based method for determining regional information according to another one more embodiment of the present disclosure.

Further referring to FIG. 5, which shows a flow 500 of the artificial intelligence based method for determining regional information according to another one more embodiment. the flow 500 of the artificial intelligence based method for determining regional information comprises:

At step 501, acquiring to-be-determined information, and extracting a keyword set of the to-be-determined information.

In the present embodiment, an electronic device (for example, the server 105 shown in FIG. 1), on which the artificial intelligence based method for determining regional information runs, may firstly acquire to-be-determined information; then perform content analysis on the to-be-determined information, so as to extract at least one of the keywords of the to-be-determined information to generate a keyword set of the to-be-determined information. Wherein the to-be-determined information may be text information on the internet. As an example, the to-be-determined information may be news on the internet.

At step 502, inputting the keyword set of the to-be-determined information into a pre-trained subject classification model for classifying, to obtain a subject category of the to-be-determined information.

In the present embodiment, based on the keyword set of the to-be-determined information extracted in step 501, the electronic device may input the keyword set of the to-be-determined information into a pre-trained subject classification model for classifying, so as to obtain a subject category of the to-be-determined information. Wherein the subject of information i.e. the main theme of the information, usually refers to the field of social life depicted by the information, that is, certain aspect of real life. For example, the subject category of the information may include: such as, a subject category of technology, a subject category of finance, a subject category of politics, a subject category of tourism.

At step 503, selecting, from a pre-stored place name set, place names corresponding to the subject category of the to-be-determined information as a target place name set.

In the present embodiment, based on the subject category of the to-be-determined information obtained in step 502, the electronic device may select, from a pre-stored place name set, place names corresponding to the subject category of the to-be-determined information as a target place name set.

At step 504, intercepting an information fragment at a pre-set position of the to-be-determined information.

In the present embodiment, the electronic device may intercept an information fragment at a pre-set position of the to-be-determined information. Wherein the information fragment at the pre-set position may be a few paragraphs at the head of the to-be-determined information, or maybe a few paragraphs in the middle of the to-be-determined information, or also maybe a few paragraphs at the tail of the to-be-determined information.

At step 505, performing word segmentation on the information segment, to acquire the keyword set of the information segment.

In the present embodiment, based on the information fragment intercepted in step 504, the electronic device may perform word segmentation on the information segment, acquire at least one of the keywords in the information fragment to generate a keyword set of the information fragment. Here, normally the electronic device does not perform de-duplication on the keywords when performing the word segmentation on the information segment.

At step 506, matching the target place name set with the keyword set of the information segment, to obtain a number of successfully matched keywords.

In the present embodiment, based on the target place name set selected in step 503 and the keyword set of the information segment acquired in step 505, the electronic device may match the target place name set with the keyword set of the information segment, to acquire the number of successfully matched keywords. As an example, the electronic device may compare each of the target place names in the target place name set with each of the keywords in the keyword set of the information fragment in turn, and if there is a target place name same with a keyword, the matching is successful, then record the target place name, and plus one on the number of the keywords (the initial number should be zero), and continue to compare until all the comparisons are completed, that is, the successfully matched keywords and the number of the successfully matched keywords can be acquired.

At step 507, determining whether the number of the successfully matched keywords is greater than a first pre-set threshold.

In the present embodiment, based on the number of the successfully matched keywords that is acquired in step 506, the electronic device may compare the number of the successfully matched keywords with the first pre-set threshold (for example the first pre-set threshold is three); execute step 508 if the number of the successfully matched keywords is greater than the first pre-set threshold; execute step 509 if the number of the successfully matched keywords is not greater than the first pre-set threshold.

At step 508, matching a pre-set hot word set in the to-be-determined information.

In the present embodiment, in the case the number of the successfully matched keywords is greater than the first pre-set threshold, the electronic device may match a hot word set in the to-be-determined information. Wherein the hot word set may be pre-set based on experience by the person skilled in the art. For example, the hot word set may include but not limited to: the hot words such as, "murders", "multiple pile-up", "pricey prawn". As an example, the electronic device may compare each of the hot words in the hot word set with each of the keywords in the keyword set of the to-be-determined information in turn; if there is a hot word same with a keyword, it indicates that the to-be-determined information includes a hot word in the hot word set; otherwise, it indicates that the to-be-determined information does not include a hot word in the hot word set.

At step 509, determining the to-be-determined information not belonging to the regional information.

At step 510, determining whether the to-be-determined information includes a hot word in the hot word set.

In the present embodiment, based on the matching result of the step 508, the electronic device may determine whether the to-be-determined information includes a hot word in the hot word set; if the to-be-determined information includes a hot word in the hot word set, it indicates that the to-be-determined information is the most influential event in a particular area, at this point, the to-be-determined information is no longer suitable to be determined as regional information, and the step 509 is returned; if the to-be-determined information does not include a hot word in the hot word set, the step 511 is then executed.

At step 511, inputting the keyword set of the to-be-determined information into the pre-trained subject classification model for classifying, to obtain the subject category of the to-be-determined information.

In the present embodiment, in the case the to-be-determined information includes a hot word in the hot word set, the electronic device may input the keyword set of the to-be-determined information into the pre-trained subject classification model for classifying, to obtain the subject category of the to-be-determined information. Wherein the information classification model may be used for representing the corresponding relation between the keyword set of the information and the category of the information, the category of the information may include hot information and non-hot information.

In the present embodiment, the information classification model may be used for representing the corresponding relation between the keyword set of the information and the category of the information. Here, the electronic device may build the information classification model through various approaches.

In some optional implementations of the present embodiment, the electronic device may generate, based on the statistics on a plenty of keyword sets of the information and classes of the information, a corresponding relation table storing multiple corresponding relations between the keyword set of the information and the category of the information, and assign this corresponding relation table as the information classification model.

In some optional implementations of the present embodiment, the above electronic device may build the information classification model according to following steps:

Firstly, the electronic device may acquire sample information, and extract a keyword set of the sample information. Here, the electronic device may perform word segmentation on the sample information, acquire at least one of the keywords of the sample information to generate the keyword set of the sample information.

Afterwards, the electronic device may count the number of historical clicks on the sample information within a pre-set period. As an example, the electronic device may count the number of historical clicks on the sample information within the latest two months.

Then, the electronic device may assign the sample information having the number of historical clicks greater than a second pre-set threshold as positive sample information, and assign the sample information having the number of historical clicks not greater than the second pre-set threshold as negative sample information. Wherein the category of the positive sample information is the category of hot information, the category of the negative sample information is the category of non-hot information. As an example, if the number of historical clicks on the sample information is greater than a second pre-set threshold (for example, the second pre-set threshold is 10000), then this sample information is positive sample information, and the category of this sample information is the category of the hot information; otherwise, this sample information is negative sample information, and the category of this sample information is the category of the non-hot information.

Finally, the electronic device may use a machine learning method, with the keyword set of the positive sample information and the keyword set of the negative sample information as respective inputs, with the category of the hot information and the category of the non-hot information as respective outputs, train and obtain the information classification model. Specifically, the electronic device may use a model used for classification, such as NBM (Naive Bayesian Model) or MEM (Maximum Entropy Model), with the keyword set of the positive sample information and the keyword set of the negative sample information as respective inputs, with the category of hot information and the category of non-hot information as respective outputs, by using the machine learning method, train the model used for classification to obtain the information classification model.

At step 512, determining whether the category of the to-be-determined information is the category of the hot information.

In the present embodiment, based on the category of the to-be-determined information obtained in the step 511, the electronic device may determine whether the category of the to-be-determined information is the category of the hot information; if the category of the to-be-determined information is the category of hot information, which indicates that what recorded in the to-be-determined information is a hot event, at this point, the to-be-determined information is no longer suitable to be determined as regional information, return to execute the step 409; if the category of the to-be-determined information is the category of non-hot information, execute the step 511.

At step 513, determining the to-be-determined information belonging to the regional information.

It can be seen from FIG. 5 that, compared with the embodiments corresponding to FIG. 2, the flow 500 of the artificial intelligence based method for determining regional information in the present embodiment adds the step of determining the category of the to-be-determined information. Therefore, the solution described in the present embodiment further reduces the case that the to-be-determined information is determined as the regional information by mistake, and further improves the recall rate of the to-be-determined information.

Figure 6:
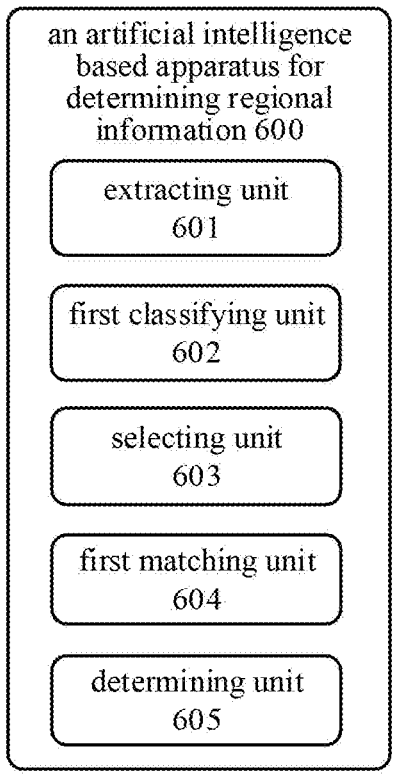
FIG. 6 is a flow chart of the artificial intelligence based apparatus for determining regional information according to one embodiment of the present disclosure.

Further referring to FIG. 6, as implementations of the method shown in the above figures, the present disclosure provides one embodiment of an artificial intelligence based apparatus for determining regional information, the embodiment of the apparatus corresponds to the method shown in FIG. 2, the embodiment may be specifically applied to various electronic device.

As shown in FIG. 6, the artificial intelligence based apparatus 600 for determining regional information of the present embodiment, may comprise: an extracting unit 601, a first classifying unit 602, a selecting unit 603, a first matching unit 604, and a determining unit 605. The extracting unit 601 is configured to acquire to-be-determined information, and extract a keyword set of the to-be-determined information; the first classifying unit 602 is configured to input the keyword set of the to-be-determined information into a pre-trained subject classification model for classifying, to obtain a subject category of the to-be-determined information, wherein the subject classification model is used for representing a corresponding relation between the keyword set of the information and the subject category of the information; the selecting unit 603 is configured to select, from a pre-stored place name set, a place name corresponding to the subject category of the to-be-determined information as a target place name set; the first matching unit 604 is configured to match, in the to-be-determined information, the target place name set; and the determining unit 605 is configured to determine, based on a matching result, whether the to-be-determined information belongs to the regional information.

In the present embodiment, in the artificial intelligence based apparatus 600 for determining regional information: the specific disposition and resulting technical effects of the extracting unit 601, the first classifying unit 602, the selecting unit 603, the first matching unit 604 and the determining unit 605 may respectively make reference to related descriptions in the step 202, the step 203, the step 204 and the step 205 of the embodiment corresponding to FIG. 2.

In some optional implementations of the present embodiment, the place name set is stored in a place name data table, and rows or columns of the place name data table are used for storing place names belonging to respective administrative levels; and the selecting unit 603 may include: an acquiring sub-unit (not shown in the figure), configured to acquire, based on a pre-set corresponding relation between the subject classes and the administrative levels, the administrative level corresponding to the subject category of the to-be-determined information; and a selecting sub-unit (not shown in the figure), configured to select, from the place name data table, the place name belonging to the administrative level corresponding to the subject category of the to-be-determined information as the target place name set.

In some optional implementations of the present embodiment, the first matching unit 604 may include: an intercepting sub-unit (not shown in the figure), configured to intercept an information fragment at a pre-set position of the to-be-determined information; a word segmenting sub-unit (not shown in the figure), configured to perform word segmentation on the information segment, to acquire the keyword set of the information segment; and a matching sub-unit (not shown in the figure), configured to match the target place name set with the keyword set of the information segment, to acquire a number of successfully matched keywords.

In some optional implementations of the present embodiment, the determining unit 605 is further configured to: determine the to-be-determined information belonging to the regional information, if the number of the successfully matched keywords is greater than a first pre-set threshold; and determine the to-be-determined information not belonging to the regional information, if the number of the successfully matched keywords is not greater than the first pre-set threshold.

In some optional implementations of the present embodiment, the artificial intelligence based apparatus 600 for determining regional information may further comprise: a second matching unit (not shown in the figure), configured to match a pre-set hot word set in the to-be-determined information, in response to the number of the successfully matched keywords being greater than a first pre-set threshold.

In some optional implementations of the present embodiment, the determining unit 605 is further configured to: determine the to-be-determined information belonging to the regional information, if the to-be-determined information does not include a hot word in the hot word set; and determine the to-be-determined information not belonging to the regional information, if the to-be-determined information includes the hot word in the hot word set.

In some optional implementations of the present embodiment, the artificial intelligence based apparatus 600 for determining regional information may further comprise: a second classifying unit (not shown in the figure), configured to input the keyword set of the to-be-determined information into a pre-trained information classification model for classifying, to obtain a category of the to-be-determined information, in response to determining the to-be-determined information not including the hot word in the hot word set, wherein the information classification model is used for representing a corresponding relation between the keyword set of the information and the category of the information, and the category of the information comprises a category of hot information and a category of non-hot information.

In some optional implementations of the present embodiment, the determining unit 605 is further configured to: determine the to-be-determined information belonging to the regional information, if the category of the to-be-determined information is the category of the non-hot information; and determine the to-be-determined information not belonging to the regional information, if the category of the to-be-determined information is the category of the hot information.

In some optional implementations of the present embodiment, the artificial intelligence based apparatus 600 for determining regional information may further comprise an information classification model building unit (not shown in the figure), the information classification model building unit (not shown in the figure) comprises: an extracting sub-unit (not shown in the figure), configured to acquire sample information, and extract a keyword set of the sample information; a statistics performing sub-unit (not shown in the figure), configured to count a number of historical clicks on the sample information within a pre-set period; a determining sub-unit, configured to assign the sample information having the number of historical clicks greater than a second pre-set threshold as positive sample information, and assign the sample information having the number of historical clicks not greater than the second pre-set threshold as negative sample information, wherein a category of the positive sample information is the category of the hot information, a category of the negative sample information is the category of the non-hot information; and a training sub-unit (not shown in the figure), configured to train, using a machine learning method, with a keyword set of the positive sample information and a keyword set of the negative sample information as respective inputs, and the category of the hot information and the category of the non-hot information as respective outputs, to obtain the information classification model.

In some optional implementations of the present embodiment, the artificial intelligence based apparatus 600 for determining regional information may further comprise: a first pushing unit (not shown in the figure), configured to acquire geographical location information of a target user, in response to determining the to-be-determined information belonging to the regional information, and determine whether the geographical location information matches with the regional information corresponding to the to-be-determined information, and if yes, push the to-be-determine information to the target user; and a second pushing unit (not shown in the figure), configured to push the to-be-determined information to the target user, in response to determining the to-be-determined information not belonging to the regional information.

Figure 7:
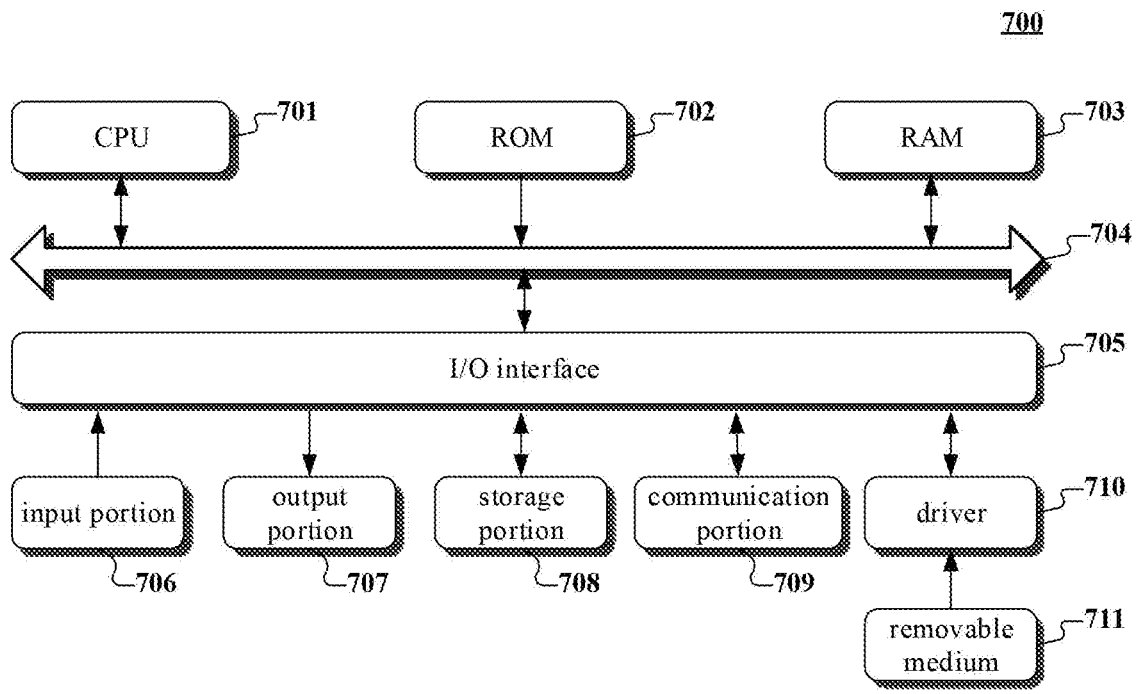
FIG. 7 is a schematic structural diagram of a computer system applicable to implement the embodiments of the present disclosure.

Following referring to FIG. 7, which shows a schematic structural diagram of a computer system applicable to implement the embodiments of the present disclosure. The server shown in FIG. 7 is merely an example, and should not bring any limitation to the function and the usage range of the embodiments of the present disclosure.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 comprising a cathode ray tube (CRT), a liquid crystal display device (LCD), a speaker etc.; a storage portion 708 including a hard disk and the like; and a communication portion 709 comprising a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 709, and/or may be installed from the removable media 711. The computer program, when executed by the central processing unit (CPU) 701, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising an extracting unit, a first classifying unit, a selecting unit, a first matching unit and a determining unit, where the names of these units or modules do not in some cases constitute a limitation to such units or modules themselves. For example, the extracting unit may also be described as "a unit for acquiring to-be-determined information, and extracting a keyword set of the to-be-determined information."

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: acquire to-be-determined information, and extract a keyword set of the to-be-determined information; input the keyword set of the to-be-determined information into a pre-trained subject classification model for classifying, to obtain a subject category of the to-be-determined information, wherein the subject classification model is used for representing a corresponding relation between the keyword set of the information and the subject category of the information; select, from a pre-stored place name set, a place name corresponding to the subject category of the to-be-determined information as a target place name set; match, in the to-be-determined information, the target place name set; and determine, based on a matching result, whether the to-be-determined information belongs to the regional information.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. An artificial intelligence based method for determining regional information, the method comprising:
    acquiring to-be-determined information, and extracting a keyword set of the to-be-determined information;
    inputting the keyword set of the to-be-determined information into a pre-trained subject classification model for classifying, to obtain a subject category of the to-be-determined information, wherein the subject classification model is used for representing a corresponding relation between the keyword set of the information and the subject category of the information;
    acquiring, based on a pre-set corresponding relation between the subject categories and administrative levels of regions of a nation, an administrative level corresponding to the subject category of the to-be-determined information, wherein the subject categories of the pre-set corresponding relation are fields of social life and comprises at least one of technology field, finance field, politics field, or tourism field, wherein a given category in the subject categories of the pre-set corresponding relation corresponds to a plurality of administrative levels of regions of the nation;
    selecting, from a pre-stored place name set, a place name corresponding to the subject category of the to-be-determined information as a target place name set, based on the acquired administrative level;
    matching, in the to-be-determined information, the target place name set; and
    determining, based on a matching result, whether the to-be-determined information belongs to the regional information.

2. The method according to claim 1, wherein the place name set is stored in a place name data table, and rows or columns of the place name data table are used for storing place names belonging to respective administrative levels; and
    the selecting, from a pre-stored place name set, a place name corresponding to the subject category of the to-be-determined information as a target place name set comprises:
    selecting, from the place name data table, the place name belonging to the administrative level corresponding to the subject category of the to-be-determined information as the target place name set.

3. The method according to claim 1, wherein the matching, in the to-be-determined information, the target place name set comprises:
    intercepting an information fragment at a pre-set position of the to-be-determined information;
    performing word segmentation on the information segment, to acquire a keyword set of the information segment; and
    matching the target place name set with the keyword set of the information segment, to acquire a number of successfully matched keywords.

4. The method according to claim 3, wherein the determining, based on a matching result, whether the to-be-determined information belongs to the regional information comprises:
    determining the to-be-determined information belonging to the regional information, if the number of the successfully matched keywords is greater than a first pre-set threshold; and
    determining the to-be-determined information not belonging to the regional information, if the number of the successfully matched keywords is not greater than the first pre-set threshold.

5. The method according to claim 3, further comprising:
    matching a pre-set hot word set in the to-be-determined information, in response to the number of the successfully matched keywords being greater than a first pre-set threshold.

6. The method according to claim 5, wherein the determining, based on a matching result, whether the to-be-determined information belongs to the regional information comprises:
    determining the to-be-determined information belonging to the regional information, if the to-be-determined information does not include a hot word in the hot word set; and
    determining the to-be-determined information not belonging to the regional information, if the to-be-determined information includes the hot word in the hot word set.

7. The method according to claim 5, further comprising:
    inputting the keyword set of the to-be-determined information into a pre-trained information classification model for classifying, to obtain a category of the to-be-determined information, in response to determining the to-be-determined information not including the hot word in the hot word set, wherein the information classification model is used for representing a corresponding relation between the keyword set of the information and the category of the information, and the category of the information comprises a class category of hot information and a category of non-hot information.

8. The method according to claim 7, wherein the determining, based on a matching result, whether the to-be-determined information belongs to the regional information comprises:
    determining the to-be-determined information belonging to the regional information, if the category of the to-be-determined information is the category of the non-hot information; and
    determining the to-be-determined information not belonging to the regional information, if the category of the to-be-determined information is the category of the hot information.

9. The method according to claim 7, further comprising building the information classification model, wherein the building the information classification model comprises:
    acquiring sample information, and extracting a keyword set of the sample information;
    counting a number of historical clicks on the sample information within a pre-set period;
    assigning the sample information having the number of historical clicks greater than a second pre-set threshold as positive sample information, and assigning the sample information having the number of historical clicks not greater than the second pre-set threshold as negative sample information, wherein a category of the positive sample information is the category of the hot information, a category of the negative sample information is the category of the non-hot information; and training, using a machine learning method, with a keyword set of the positive sample information and a keyword set of the negative sample information as respective inputs, and the category of the hot information and the category of the non-hot information as respective outputs, to obtain the information classification model.

10. The method according to claim 1, further comprising:

acquiring geographical location information of a target user, in response to determining the to-be-determined information belonging to the regional information, and determining whether the geographical location information matches with the regional information corresponding to the to-be-determined information, and if yes, pushing the to-be-determined information to the target user; and pushing the to-be-determined information to the target user, in response to determining the to-be-determined information not belonging to the regional information.

11. An artificial intelligence based apparatus for determining regional information, the apparatus comprising:

at least one processor; and a memory storing instructions, which when executed by the at least one processor, cause the at least one processor to perform operations, the operations comprising:

acquiring to-be-determined information, and extracting a keyword set of the to-be-determined information;

inputting the keyword set of the to-be-determined information into a pre-trained subject classification model for classifying, to obtain a subject category of the to-be-determined information, wherein the subject classification model is used for representing a corresponding relation between the keyword set of the information and the subject category of the information;

acquiring, based on a pre-set corresponding relation between subject categories and administrative levels of regions of a nation, an administrative level corresponding to the subject category of the to-be-determined information, wherein the subject categories of the pre-set corresponding relation are fields of social life and comprises at least one of technology field, finance field, politics field, or tourism field, wherein a given category in the subject categories of the pre-set corresponding relation corresponds to a plurality of administrative levels of regions of the nation;

selecting, from a pre-stored place name set, a place name corresponding to the subject category of the to-be-determined information as a target place name set, based on the acquired administrative level;

matching, in the to-be-determined information, the target place name set; and determining, based on a matching result, whether the to-be-determined information belongs to the regional information.

12. The apparatus according to claim 11, wherein the place name set is stored in a place name data table, and rows or columns of the place name data table are used for storing place names belonging to respective administrative levels; and the selecting, from a pre-stored place name set, a place name corresponding to the subject category of the to-be-determined information as a target place name set comprises:

selecting, from the place name data table, the place name belonging to the administrative level corresponding to the subject category of the to-be-determined information as the target place name set.

13. The apparatus according to claim 11, wherein the matching, in the to-be-determined information, the target place name set comprises:

intercepting an information fragment at a pre-set position of the to-be-determined information;

performing word segmentation on the information segment, to acquire the keyword set of the information segment; and matching the target place name set with the keyword set of the information segment, to acquire a number of successfully matched keywords.

14. The apparatus according to claim 13, wherein the determining, based on a matching result, whether the to-be-determined information belongs to the regional information comprises:

determining the to-be-determined information belonging to the regional information, if the number of the successfully matched keywords is greater than a first pre-set threshold; and determining the to-be-determined information not belonging to the regional information, if the number of the successfully matched keywords is not greater than the first pre-set threshold.

15. The apparatus according to claim 13, wherein the operations further comprise:

matching a pre-set hot word set in the to-be-determined information, in response to the number of the successfully matched keywords being greater than a first pre-set threshold.

16. The apparatus according to claim 15, wherein the determining, based on a matching result, whether the to-be-determined information belongs to the regional information comprises:

determining the to-be-determined information belonging to the regional information, if the to-be-determined information does not include a hot word in the hot word set; and determining the to-be-determined information not belonging to the regional information, if the to-be-determined information includes the hot word in the hot word set.

17. The apparatus according to claim 15, wherein the operations further comprise:

inputting the keyword set of the to-be-determined information into a pre-trained information classification model for classifying, to obtain a category of the to-be-determined information, in response to determining the to-be-determined information not including the hot word in the hot word set, wherein the information classification model is used for representing a corresponding relation between the keyword set of the information and the category of the information, and the category of the information comprises a category of hot information and a category of non-hot information.

18. The apparatus according to claim 17, wherein the determining, based on a matching result, whether the to-be-determined information belongs to the regional information comprises:

determining the to-be-determined information belonging to the regional information, if the category of the to-be-determined information is the category of the non-hot information; and determining the to-be-determined information not belonging to the regional information, if the category of the to-be-determined information is the category of the hot information.

19. The apparatus according to claim 17, wherein the operations further comprise building the information classification model, wherein the building the information classification model comprises:

acquiring sample information, and extract a keyword set of the sample information;

counting a number of historical clicks on the sample information within a pre-set period;

assigning the sample information having the number of historical clicks greater than a second pre-set threshold as positive sample information, and assigning the sample information having the number of historical clicks not greater than the second pre-set threshold as negative sample information, wherein a category of the positive sample information is the category of the hot information, a category of the negative sample information is the category of the non-hot information; and training, using a machine learning method, with a keyword set of the positive sample information and a keyword set of the negative sample information as respective inputs, and the category of the hot information and the category of the non-hot information as respective outputs, to obtain the information classification model.

20. A non-transitory computer-readable storage medium, storing a computer program thereon, wherein the program, when executed by a processor, causes the processor to perform operations comprising:

acquiring to-be-determined information, and extracting a keyword set of the to-be-determined information;

inputting the keyword set of the to-be-determined information into a pre-trained subject classification model for classifying, to obtain a subject category of the to-be-determined information, wherein the subject classification model is used for representing a corresponding relation between the keyword set of the information and the subject category of the information;

acquiring, based on a pre-set corresponding relation between the subject categories and administrative levels of regions of a nation, an administrative level corresponding to the subject category of the to-be-determined information, wherein the subject categories of the pre-set corresponding relation are fields of social life and comprises at least one of technology field, finance field, politics field, or tourism field, wherein a given category in the subject categories of the pre-set corresponding relation corresponds to a plurality of administrative levels of region of the nation;

selecting, from a pre-stored place name set, a place name corresponding to the subject category of the to-be-determined information as a target place name set, based on the acquired administrative level;

matching, in the to-be-determined information, the target place name set; and determining, based on a matching result, whether the to-be-determined information belongs to the regional information.

21. The method according to claim 1, wherein the administrative levels of regions of the nation in the pre-set corresponding relation comprise: a national level, a provincial level, a prefectural level, a country level, and a township level, and the administrative levels of regions of the nation corresponding to the given category comprise at least two of: the national level, the provincial level, the prefectural level, the country level, and the township level.

* * * * *